United States Patent Office 3,420,311
Patented Jan. 7, 1969

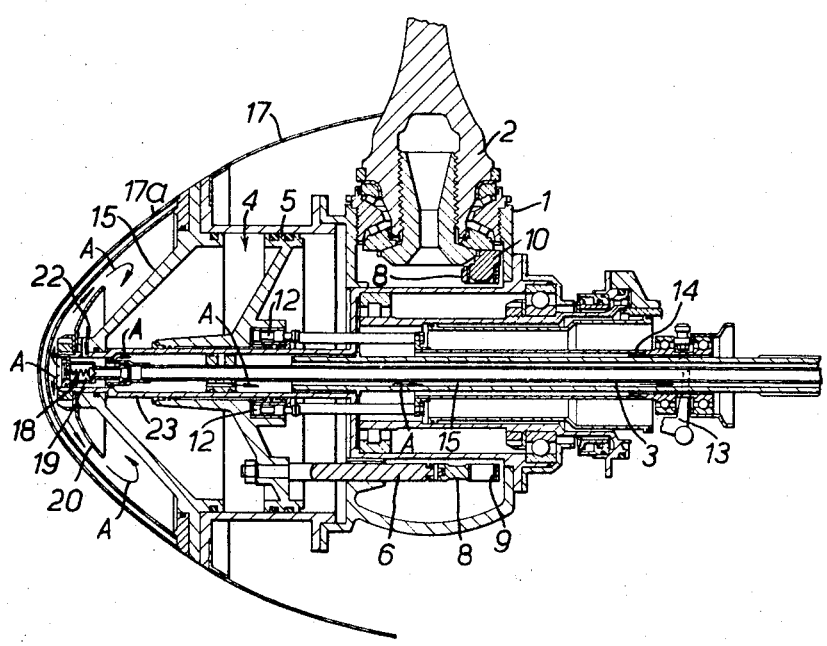

3,420,311
BLADED ROTORS
Stuart Duncan Davies and John Alfred Chilman, Painswick, England, assignors to Dowty Rotol Limited, Gloucester, England
Filed Apr. 12, 1967, Ser. No. 630,252
Claims priority, application Great Britain, Apr. 12, 1966, 16,009/66
U.S. Cl. 170—160.32
Int. Cl. B64c 11/14
16 Claims

ABSTRACT OF THE DISCLOSURE

A bladed rotor, for example an aircraft propeller, has a hollow spinner portion formed integrally with or carried upon a hub of the rotor. A conduit or the like for liquid under pressure passes through the hub, and a relief valve provided in the conduit is positioned in close proximity to an interior surface of the nose portion of the spinner so that liquid discharging from the relief valve first impinges on the spinner before passing under centrifugal force around said interior surface and thence to drain. Heat exchange between the liquid and the spinner acts to heat the latter for anti-icing purposes and cools the liquid which is conveniently utilised for operation of a pitch-change motor operative for pitch variation of the rotor blades.

---

This invention relates to bladed rotors, which term is intended to include propellers, wind motors (such as ram air turbines), fans, compressors and the like.

According to the invention a bladed rotor has a hollow spinner portion formed integrally with or carried upon a hub of the rotor, and includes a conduit or the like for liquid under pressure passing through the hub and a relief valve provided in the conduit and positioned in close proximity to an interior surface of the nose portion of the spinner, so that liquid discharging from the relief valve first impinges on said nose portion before passing under centrifugal force around said interior surface and thence to drain.

The invention is particularly well suited for application to a bladed rotor mounted at the forward end of an aircraft power plant, the heat interchange between the liquid and the spinner preventing the formation of ice on the exterior of the spinner. The liquid is conveniently oil which circulates within the hub of the rotor, in addition to ice prevention the arrangement providing means for cooling the oil. Further, since the oil is urged radially outwardly around said interior surface of the spinner centrifugal air/oil separation is afforded as the oil commences its passage to drain.

Reference hereinafter to "oil" as the liquid is, where appropriate, to be construed broadly as including other liquids.

Where the bladed rotor has blading of variable pitch, the conduit means supply the oil under pressure for the operation of a hydraulic pitch-change motor connected to the blades with the relief valve determining the maximum hydraulic operating pressure.

The conduit may receive the oil under pressure from a pump provided externally of the bladed rotor, with an associated reservoir from which the pump draws the oil and to which the centrifuged oil may drain also provided externally of the rotor. Alternatively, the pump may be mounted within the hub of the rotor and be so constructed and driven as to be operable upon rotation of the rotor. With such a construction the pump may draw its oil from an annular reservoir formed by, or within, the hub.

The conduit may be formed with its axis coincident with the axis of rotation of the rotor, conveniently by a central tube extending axially through the hub, and with a movable element of the relief valve also lying on that axis so that relatively hot oil discharging from the relief valve impinges at the centre of the nose portion of the spinner. It is here, under icing conditions, that ice is most likely otherwise to commence to form. The centrifuged oil may drain back along a passage which also extends through the hub and surrounds the central conduit tube.

The spinner may be of double-skin type, and the oil discharging from the relief valve may be caused to enter the space between the two skins and to pass therefrom through suitable porting around the inner periphery of the spinner. However, it is preferred that the relief valve should discharge on to the innermost surface of the spinner, whether of single- or double-skin type, with an annular deflector provided within the spinner and near the nose portion to guide the oil as it passes radially outwardly under centrifugal force. The deflector is preferably of dished form with its convex side facing and spaced from the spinner. In order to pass to drain the centrifuged oil may be urged at least somewhat radially inwardly, passing into a drain channel which is in communication with the liquid reservoir.

The centrifuged oil may leave the space within the spinner through porting which is disposed close to and within the annular deflector, so as to be shrouded by the latter which ensures that the oil cannot pass directly to drain without being adequately centrifuged. This porting may communicate directly with the drain channel provided by the aforesaid passage surrounding a central conduit tube.

At typical example of application of the invention is an aircraft propeller the blades of which are of variable pitch, pitch adjustment being effected by the operation of a hydraulic pitch-change motor provided in the hub and supplied with hydraulic liquid from the conduit of the invention.

The invention will now be further described with reference to the accompanying drawing which, by way of example, illustrates in axial section a hub, pitch-change mechanism and spinner of a variable pitch aircraft propeller utilising the invention for ice prevention and oil cooling.

The propeller has a hub structure indicated generally by the reference 1 in which are rotatably supported the blade roots, such as 2, of a plurality of blades in the usual manner, only the root end portion of one blade being shown in the drawing. A supply conduit for oil under pressure is provided in the hub by a central tube 3 which passes through the hub, the tube axis being coincident with the axis of rotation of the propeller. The tube 3 supplies the oil as a hydraulic liquid for the operation of a pitch-change motor of the piston and cylinder type indicated generally by the reference 4, the motor including a hydraulic piston 5 connected through a ring of axially slidable rods such as 6 to the respective blade roots 2. Each rod is pivotally connected to one end of a link such as 8 the other end of which has a bushed bore 9 which engages an inwardly projecting crank pin at the respective blade root 2. For the purpose of illustration the link 8 at the bottom of the drawing is shown aligned with the corresponding rod 6, whereas normally it would connect with a crank pin 10 out of the drawing plane. Thus axial movement of the piston 5 effects simultaneous pitch adjustment of all the blades through the medium of the rods 6 and links 8.

The application of oil under pressure to one side or other of the piston 5 of the motor 4 from the tube 3 is controlled by the operation of servo-valve means 12 also provided within the hub 1 and operable directly by the pilot of the aircraft through a mechanical linkage. Only the engine end of the linkage is shown at 13, and this linkage operates the valve means 12 through a pitch control tube 14 which is axially movable within the hub 1 and projects rearwardly of the latter for connection to the linkage 13 as shown. The tube 14 surrounds the central conduit tube 3 and is coaxial therewith. The pitch-change motor 4 and valve means 12 are so constructed that together they constitute a manually initiated follow-up servo mechanism of closed-loop type, thus providing positional control in addition to power assistance.

The tube 3 passes rearwardly of the propeller and communicates, at the righthand end in the drawing, with the discharge side of an engine-driven pump (not shown) which draws oil from a reservoir formed in the engine structure. A drain passage 15 which surrounds the central tube 14 leads back from the hub 1 to the reservoir, which is also not shown.

A forward end wall 16 of the cylinder of the pitch-change motor 4 is generally frusto-conical in shape and supports a sheet metal spinner 17 the nose portion 17a of which is of double-skin form. The pressure tube 3 passes forwardly through the hub 1 and a pressure relief valve 18 is provided at the forward extremity of the tube, i.e. the lefthand end in the drawing, immediately adjacent the nose portion 17a of the spinner 17 and in close proximity to the inner skin thereof. The valve 18 has a spring-loaded movable element 19 with its axis coincident with the axis of rotation, and the valve discharges on to the interior surface of the inner skin of the spinner nose portion 17a centrally of the latter.

An annular deflector 20 which is of dished form and surrounds the valve 18 is provided within the spinner 17 near the nose portion thereof to guide the discharged oil as it passes radially outwardly under centrifugal force, and this deflector ensures that the oil is adequately centrifuged before returning to drain through porting, provided by a ring of radial drain ports such as 22 disposed close to and within the deflector 20 so as to be shrouded by the latter. The direction of oil flow from the valve 18 and back to the reservoir through the drain passage 15 is indicated generally by arrows A. The ports 22 are formed through a central boss of the cylinder end wall 16 and the wall of a spigot tube 23 within which the forward end of the tube 3 and the valve 18 are supported and on which the piston 5 slides. The forward end of the spigot tube 23 is itself supported in the end wall 16 of the cylinder with the tube 23 extending forwardly from the main hub structure.

In operation of the engine and propeller, the oil under pressure is continuously supplied to the pressure conduit tube 3, and for a major portion of the time is discharging through the relief valve 18 at the forward end of the hub 1. The hot oil passes through the valve 18 and impinges on the wall of the spinner nose portion 17a where it is effective to prevent the formation of ice on the external surface of the spinner 17 when the propeller is operating in icing conditions. The oil passes radially outwardly under centrifugal force, as indicated by the arrows A, between the inner skin of the spinner nose portion 17a and the deflector 20. The circulation is such that the oil contained in the internal space between the spinner nose portion 17a and the cylinder wall 16 is forced through the drain porting 22 into the drain passage 15 from whence it returns to reservoir.

By placing the relief valve 18 close to the nose of the spinner 17, as described, heat in the discharging oil is applied at the centre of the spinner which is the most important point from the anti-icing standpoint because it is at the centre that ice would otherwise commence to build up. At the same time the hot oil is cooled and thus the arrangement provides an oil cooler as well as anti-icing means for the spinner.

In passing radially outwardly from the centre in contact with the inner skin of the spinner 17 the oil heats the remaining surface of the spinner to a certain extent, but this heating effect becomes less proportionally to the distance away from the rotational axis.

Since the oil is urged radially outwardly under centrifugal force after leaving the valve 18 good oil/air separation occurs. Thus, as well as providing anti-icing and oil cooling, the arrangement is operative as an oil/air separator.

We claim:

1. A bladed rotor assembly comprising a hub structure, rotor blading mounted on and projecting radially of the hub structure, a hollow spinner portion rotatable with the hub structure, conduit for liquid under pressure passing through the hub structure, and a relief valve provided in the conduit and operative to discharge liquid therefrom, said relief valve being positioned in close proximity to an interior surface of the nose portion of the spinner so that liquid discharged by the valve first impinges on the nose portion before passing under centrifugal force around said interior surface and thence to drain.

2. A bladed rotor according to claim 1, wherein the rotor blading is of variable pitch and the conduit means supply said liquid under pressure for the operation of a hydraulic pitch-change motor connected to the blades.

3. A bladed rotor according to claim 2, wherein the space within the spinner in which the liquid is centrifuged is defined between the spinner and an end wall of a hydraulic cylinder of the pitch-change motor.

4. A bladed rotor according to claim 3, wherein said end wall is of generally frusto-conical shape and projects into the spinner.

5. A bladed rotor according to claim 1, wherein the conduit receives the liquid under pressure from a pump provided externally of the rotor, with an associated reservoir from which the pump draws the liquid and to which the centrifuged liquid drains also provided externally of the rotor.

6. A bladed rotor according to claim 1, wherein the conduit is formed with its axis coincident with the axis of rotation of the rotor.

7. A bladed rotor according to claim 6, wherein a movable element of the relief valve also lies on said axis of rotation so that liquid discharging from the relief valve impinges at the center of the nose portion of the spinner.

8. A bladed rotor according to claim 7, wherein said conduit is provided by a central tube which extends axially through the rotor hub.

9. A bladed rotor according to claim 8, wherein the centrifuged liquid drains back along a passage which also extends through the hub and surrounds the central tube.

10. A bladed rotor assembly comprising a hub structure, rotor blading mounted on and projecting radially of the hub structure, a hollow spinner portion rotatable with the hub structure, an annular deflector positioned within the spinner adjacent a nose portion thereof and also rotatable with the hub structure, a conduit for liquid under pressure passing through the hub structure, and a relief valve provided in the conduit and operative to discharge liquid therefrom, said relief valve being positioned in close proximity to an interior surface of the nose portion of the spinner so that liquid discharged by the valve first impinges on the nose portion before passing under centrifugal force around said interior surface while guided by said deflector and thence to drain.

11. A bladed rotor according to claim 10, wherein the deflector is of dished form, with a convex surface facing towards the spinner.

12. A bladed rotor according to claim 1, wherein in order to pass to drain the liquid is urged somewhat radially inwardly before passing into a drain channel through the hub.

13. A bladed rotor according to claim 12, wherein the centrifuged liquid leaves the space within the spinner through porting which is disposed close to and within the annular deflector so as to be shrouded by the latter.

14. A bladed rotor according to claim 13, wherein said porting communicates directly with a drain passage which extends through the hub and surrounds said central tube.

15. A bladed rotor according to claim 10, wherein the spinner comprises a portion of double-skin type and the relief valve discharges on the inner surface of the inner skin.

16. A bladed rotor according to claim 1, wherein the rotor is an aircraft propeller.

References Cited

UNITED STATES PATENTS

| 2,779,423 | 1/1957 | Cushman | 170—159 |
| 3,037,560 | 6/1962 | Pond | 170—160.32 X |
| 3,339,639 | 9/1967 | Elmes et al. | 170—160.32 X |

EVERETTE A. POWELL, JR., *Primary Examiner.*

U.S. Cl. X.R.

170—159, 160.23